(12) United States Patent
Fujie et al.

(10) Patent No.: US 7,110,659 B2
(45) Date of Patent: Sep. 19, 2006

(54) APPARATUS AND A METHOD FOR RECORDING AND REPRODUCING A BROADCAST PROGRAM

(75) Inventors: Keiichiro Fujie, Tokyo (JP); Shozo Isobe, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1094 days.

(21) Appl. No.: 09/884,986

(22) Filed: Jun. 21, 2001

(65) Prior Publication Data

US 2002/0001459 A1    Jan. 3, 2002

(30) Foreign Application Priority Data

Jun. 30, 2000  (JP)  ............................ P2000-199623

(51) Int. Cl.
*H04N 5/91*  (2006.01)
(52) U.S. Cl. ....................................................... 386/46
(58) Field of Classification Search .................... 386/1, 386/46; 348/1–5, 7, 10, 460, 907; 380/201, 380/203, 210, 212, 227, 230, 233, 239; 705/52, 705/57; 709/207; 455/2, 3.1, 56.1, 67.1, 455/115
See application file for complete search history.

(56) References Cited

U.S. PATENT DOCUMENTS 5,584,050 A * 12/1996 Lyons ........................ 455/2.01
6,463,152 B1 * 10/2002 Takahashi ................... 380/201
2001/0023433 A1 * 9/2001 Natsubori et al. .......... 709/207

FOREIGN PATENT DOCUMENTS

JP    11-18113    1/1999

* cited by examiner

*Primary Examiner*—Thai Tran
*Assistant Examiner*—Mishawn Dunn
(74) *Attorney, Agent, or Firm*—Oblon, Spivak, McClelland, Maier & Neustadt, P.C.

(57) ABSTRACT

In an apparatus for recording and reproducing a broadcast program, a receiver receives program content data broadcasted. The program content data includes viewer response request information. A memory records the program content data received by the receiver. A decoder decodes the program content data in case of reproducing the program content data recorded in the memory, and extracts the response request information from decoded program contents data. A sending unit sends an item to be counted in response to the viewer's response to the response request information.

23 Claims, 9 Drawing Sheets

CM_identify_information

| CM_id<br>(CM identifier) | IP_address<br>(server address) | available_day<br>(effective term) | Company_name<br>(sponsor name) | CM_name<br>(CM title) |
|---|---|---|---|---|
| 4byte | 4byte | 8byte | 16byte | 32byte |

FIG. 1 response_user_data(i)

| user_data_<br>start_code<br>0 × 000001B2 | response_id<br>0 × 5245330 | CM_identify_<br>information[i] |
|---|---|---|
| 4byte | 4byte | 1byte |

FIG. 2

CM_audience_response_information

| CM_id | Apparatus_id |
|---|---|

FIG. 11A

CM_audience_response_information

| CM_id | Apparatus_id | User_id |
|---|---|---|

FIG. 11B

APPARATUS AND A METHOD FOR RECORDING AND REPRODUCING A BROADCAST PROGRAM

FIELD OF THE INVENTION

The present invention relates to an apparatus and a method for recording and reproducing a broadcast program and for encouraging a viewer to watch a commercial program without skipping over the commercial program.

BACKGROUND OF THE INVENTION

In CS digital broadcast or BS digital broadcast beginning in 2000, program information except for broadcast program can be transmitted. Accordingly, various services can be provided. For example, if the program information such as a program title, performers, or a genre is provided for each program by an electrical program guide (EPG), a viewer easily executes operation of recording reservation or registers his interesting genre and performer with the recorder. In this way, his desired program can be automatically retrieved from the broadcast program and recorded. Furthermore, in proportion to multi-channel in CS digital broadcast or BS digital broadcast, it often happens that multiple desired programs are telecasted at the same time. In consideration of the above-mentioned status, the viewer does not always watch the broadcast program in real time. After recording the broadcast program, the viewer often watches the broadcast program by reproducing the broadcast program. Hereafter, the latter case is predicted to increase.

On the other hand, recently, recording/reproducing apparatus such as VTR often include a function to skip CM (commercial program) while recording the broadcast program. Furthermore, recently, a set top box (STB) and a personal video recorder (PVR) storing disk storage such as HDD appeared on the market. In these equipments, the broadcast program is easily recorded by skipping CM or the recorded broadcast program is easily reproduced by random access function on the disk while CM in the broadcast program is skipped.

In this way, if program audience status to record/reproduce the broadcast program by skipping CM is widely spread, as for an advertiser (i.e., CM provider) of the broadcast program, chance for the viewer to watch CM of the advertiser's company reduces. Accordingly, a method to encourage the viewer watch the CM program is desired.

In this case, one example of the method to certainly have the viewer watch the CM program is disclosed in Japanese Patent disclosure (Kokai) PH 11-18113. In this reference, a message such as an inquiry is displayed during telecasting the CM program. If the viewer replies to the message, a point is counted for the viewer, and a program charge of a toll broadcast is discounted in proportion to the point. However, in this method, it is the assumption that the viewer watches the broadcast CM on real time. As for view situation that the broadcast CM program is reproducing after recording, the effect is not expected. Accordingly, even if the broadcast CM is recorded and reproduced after that, by giving point information to the viewer, the broadcast program recording/reproducing apparatus to promote for the user to watch CM without skipping is desired.

BRIEF SUMMARY OF THE INVENTION

It is an object of the present invention to provide an apparatus and a method for recording and reproducing a broadcast program to encourage the viewer to watch the commercial program without skipping in case of reproducing the broadcast program including the commercial program after recording the broadcast program.

According to an aspect of the present invention, there is provided an apparatus for recording and reproducing a broadcast program, comprising: a receiver configured to receive program content data broadcastly distributed, the program content data including response request information to request a viewer's response; a memory configured to record the program content data received by said receiver; a decoder configured to decode the program content data in case of reproducing the program content data stored in said memory, and to extract the response request information from decoded program content data; and a sending unit configured to send item to be counted in respect of the viewer's response based on the response request information.

Further in accordance with another aspect of the present invention, there is also provided a method for recording and reproducing a broadcast program, comprising: receiving program content data broadcastly distributed, the program content data including response request information to request a viewer's response; recording the program content data received at the receiving step in a memory; decoding the program content data in case of reproducing the program content data recorded in said memory; extracting the response request information from decoded program content data; and sending an item to be counted in respect of the viewer's response based on the response request information.

Further in accordance with another aspect of the present invention, there is also provided a computer program product for use with a computer, comprising: a computer usable medium having computer readable program code embodied in said medium for causing said computer to record and reproduce broadcast program, said computer program product having: computer readable program code to receive program content data broadcastly distributed, the program content data including response request information to request a viewer's response; computer readable program code to record the program content data in a memory; computer readable program code to decode the program content data in case of reproducing the program content data recorded in said memory; computer readable program code to extract the response request information from decoded program content data; and computer readable program code to send an item to be counted in respect of the viewer's response based on the response request information.

BRIEF DESCRIPTION OF THE DRAWINGS

FIG. 1 is an example of a data component of commercial identify information.

FIG. 2 is an example of a data component of response user data according to one embodiment of the present invention.

FIGS. 11A and 11B are examples of a data component of commercial audience response information according to one embodiment of the present invention.

DETAILED DESCRIPTION OF THE INVENTION

Figure 3:
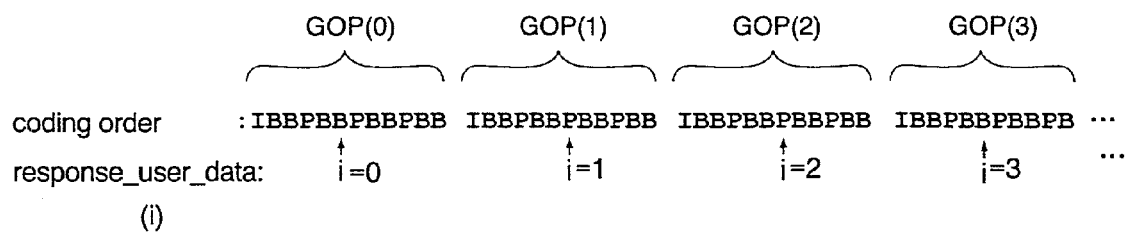
FIG. 3 is a schematic diagram to explain multiplex method of the response user data according to one embodiment of the present invention.

Hereinafter, embodiments of the present invention will be explained by referring to the drawings. In the present embodiment, digital broadcast using MPEG 2 transport stream is recorded in information record media, and then the point corresponding to CM (commercial message) such as TV commercial is obtained for viewing in case of reproducing (watching).

In the present embodiment, the broadcast program content data sent by the broadcasting station includes CM content data (video, speech). The CM content data includes response request information to request the viewer's response and accept the response. In return for the viewer's response based on the response request information, a point is given to the viewer or the reproducing apparatus of the viewer. In order to give the point in case of viewing CM content data, the response request information is multiplexing on the CM contents data.

A method for multiplexing the response request information on the CM content data (Hereinafter, it is called CM data) in the broadcast program content data (Hereinafter, it is called program data) is explained. In the present embodiment, for example, CM identify information describing an attribute of the CM (CM identifier, CM company name, available day, and so on) is defined. FIG. 1 shows a data component of the CM identify information. For example, the CM identify information is 64 byte data, which includes a CM identifier (CM_id), a server address (IP_address) of CM audience response control server for receiving CM audience response and creating point information of each viewer or each apparatus, an effective term (available_day), a sponser name (Company_name), and a CM title (CM_name). The CM identify information is called response request information.

The CM identify information is divided by unit of one byte. Each divided CM identify information of one byte (CM_identify_information [i], i=~63) is included in user data (i) defined by MPEG 2 video, and 64 units of user data (i) are created. In short, the CM identify information is divided into a plurality of user data (i) and each user data is multiplexing on MPEG 2 video stream as the CM video. FIG. 2 shows data component of the user data (response_user_data (i)). The user data is sequentially multiplexing on 64 units of pictures suitably selected from all pictures of bit stream of the CM video.

FIG. 3 shows a schematic diagram to explain the method for multiplexing the user data on encoded picture data of CM video. In case of MPEG 2 video stream, all pictures of each group (GOP: group of twelve pictures) are encoded by MPEG coding method. As shown in FIG. 3, encoded pictures in each group (GOP (0), GOP (1), . . . ) are arranged by predetermined coding order "IBBPBBPBBPBB". Each user data (response_user_data (i)) is sequentially multiplexing on arbitrary picture of encoded video data. For example, the user data (0) is multiplexing on encoded picture B of GOP (0), the user data (1) is multiplexing on encoded picture P of GOP (1), the user data (2) is multiplexing on encoded picture (P) of GOP (2), and the user data (3) is multiplexing on encoded picture B of GOP (3). In short, each user data (i) must be sequentially multiplexing on encoded picture in order. However, the encoded picture to be multiplexed can be arbitrarily selected from each GOP.

Figure 4:
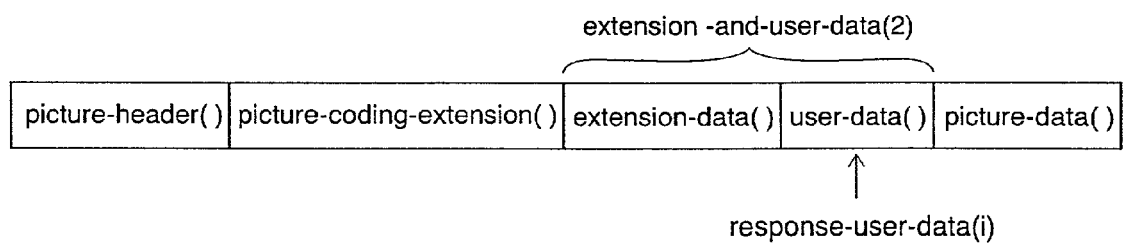
FIG. 4 is an example of the response user data inserting on picture data.

FIG. 4 shows an example of status of the user data inserting on encoded picture data of MPEG format. As shown in FIG. 4, in general, the user data (response-user-data (i)) is included in extension-and-user-data (2) of the encoded picture data. The extension-and-user-data (2) is positioned next to picture-header ( ) and picture-coding-extension ( ) of the encoded picture data. In this way, each user data is sequentially inserting on arbitrary encoded picture. In other words, when all encoded pictures of all groups (GOP (0), GOP(1), . . . ) are decoded, all user data (i: i=0~63) are also decoded and the CM identify information is regenerated by combining the all user data.

Figure 5:
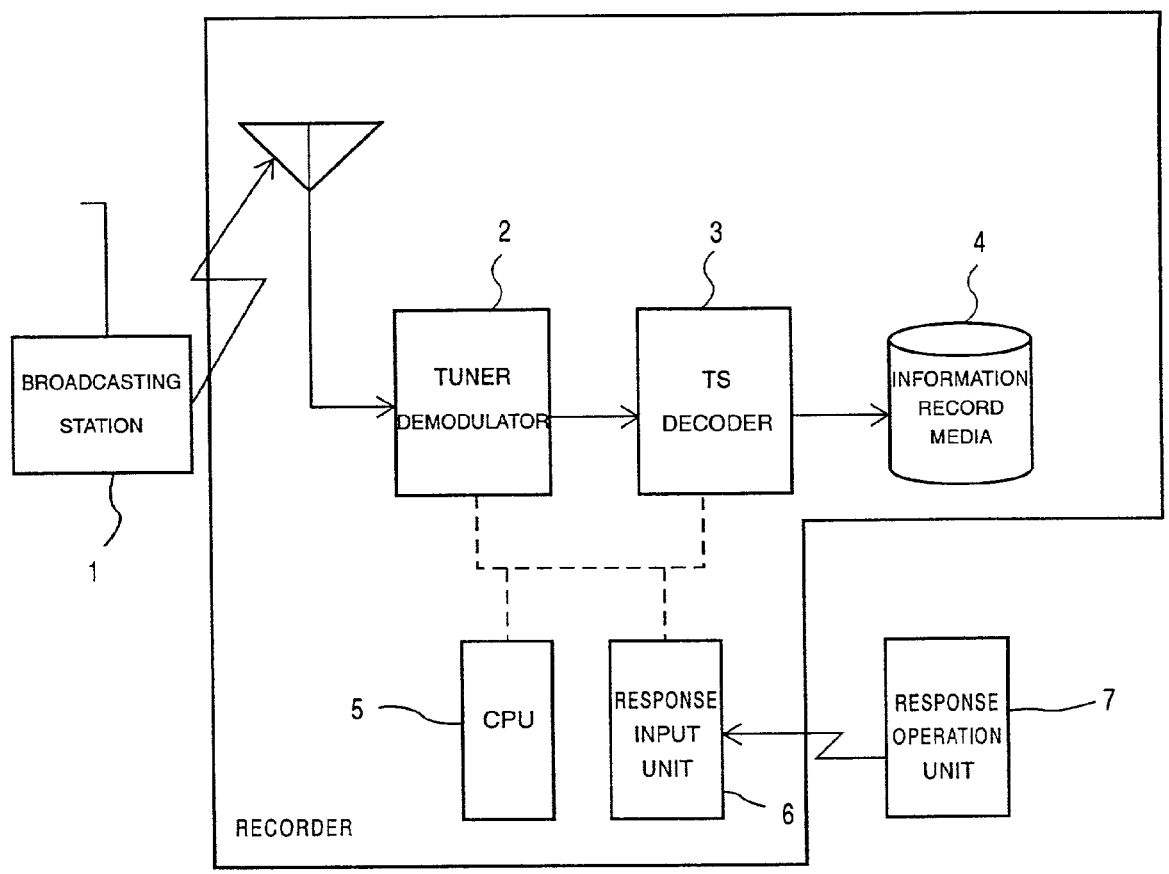
FIG. 5 is a block diagram of a broadcast program recorder according to one embodiment of the present invention.

Next, FIG. 5 is a block diagram of a broadcast program recording apparatus for recording the digital broadcast program broadcasted using MPEG 2 transport stream in information record media. As shown in FIG. 5, the broadcast program recording apparatus includes a tuner/demodulator 2, a MPEG 2 transport stream decoder 3 (Hereinafter, it is called TS decoder), an information record media 4, a CPU 5, and a response input unit 6. The response input unit 6 inputs data from a response operation unit 7 executable by a remote operation from the viewer.

Figure 6:
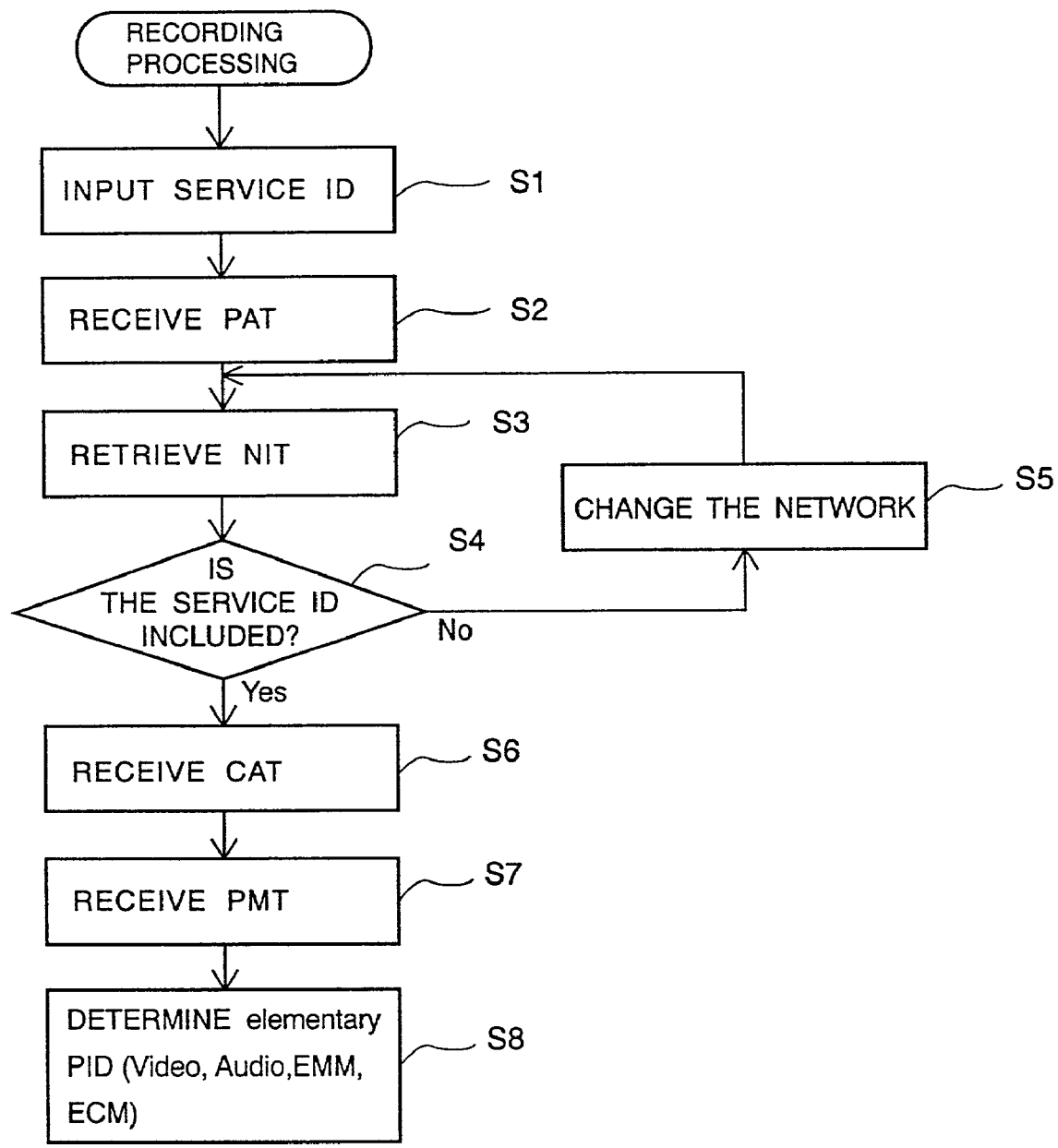
FIG. 6 is a flow chart of recording processing of the broadcast program recorder in FIG. 5.

Next, processing of the broadcast program recording apparatus in FIG. 5 is explained. FIG. 6 is a flow chart of recording processing of the broadcast program recording apparatus. Especially, after receiving the broadcast wave distributed by the broadcasting station 1, selection processing of identifier PID (Packet Identifier) of transport stream packet from MPEG 2 transport stream is explained. The MPEG 2 transport stream includes necessary data for recording desired program data. In the following explanation, user data, PAT, PMT, network PID, NIT, service ID, program number, CAT, program map PID, ECM, EMM, and elementary PID, CA_PID, are defined by MPEG video and MPEG 2 system. Accordingly, a detailed explanation of each term is omitted.

Figure 7:
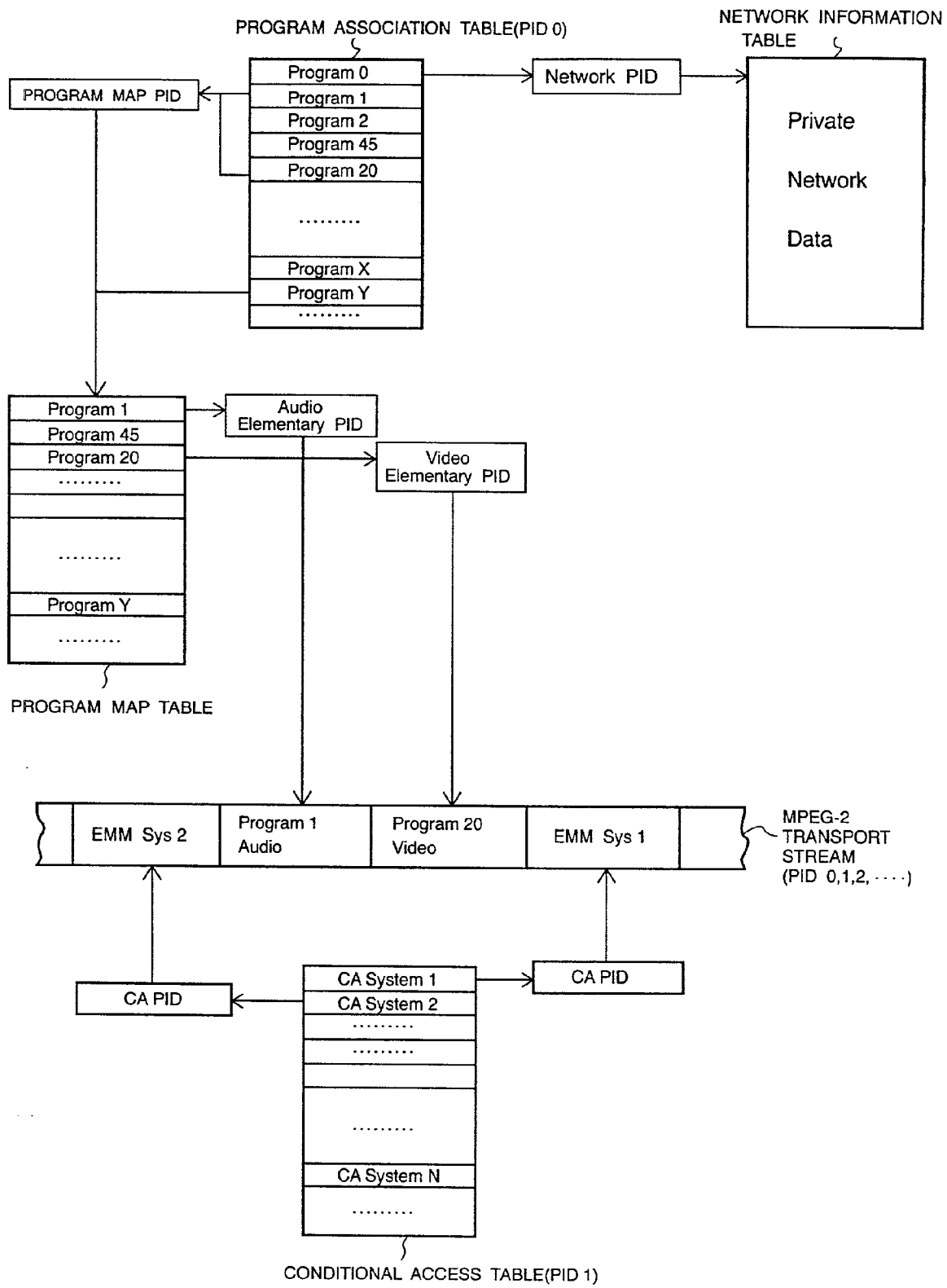
FIG. 7 is a schematic diagram of a program and network mapping relationship.

First, the broadcasting station 1 broadcastly distributes a modulation wave of MPEG 2 transport stream (For example, transponder) multiplexing a plurality of program data. The tuner/demodulator 2 selects one transport stream and sends it to TS decoder 3. FIG. 7 is a schematic diagram of packet component of the one transport stream and network mapping relationship. In FIG. 7, the TS decoder 3 receives MPEG 2 transport stream (PID 0, 1, 2, . . . ). On the other hand, the viewer selects channel number to watch his desired program through the response operation unit 7. In this case, service ID corresponding to the viewer's selected channel number is informed to the TS decoder 3 (S1). The TS decoder 3 receives PAT (Program Association table) from the MPEG 2 transport stream. In FIG. 7, the PAT is packet of PID 0 in the MPEG 2 transport stream. In the PAT, PID of Program Map Table (PMT) is described by unit of program number to discriminate each program. The PMT is explained afterwards. Furthermore, in the PAT, network PID is also described. The network PID represents PID of Network Information Table (NIT) in case of program number "0X0000". The NIT represents physical information of transmission path. By referring to the network PID, the TS decoder 3 retrieves the NIT and checks whether the service ID is included in the received transport stream (S3). If the service ID is not included, the tuner/demodulator 2 selects another transport stream (S5), and the processing is returned to S3. If the service ID is included, the TS decoder 3 receives CAT (Conditional Access Table) from the MPEG 2 transport stream (S6). The CAT represents PID of packet including cryptographic decode information to solve scramble. In FIG. 7, the CAT is packet of PID "1" in the MPEG 2 transport stream. Furthermore, by referring to Program Map PID accompanying with program number corresponding to the service ID in the PAT, the TS decoder 3 receives the PMT from the MPEG 2 transport stream (S7). In this case, the service ID is regarded as the program number. In the PMT, PID of packet including program contents (video, speech, additional data) is described by unit of program number. Concretely, elementary PID of each stream type corresponding to the program number (the service ID) is recognized by referring to the PMT. For example, the stream type is video, speech, ECM (Entitlement Control Message: key common information), or EMM (Entitlement Management Message: key individual information). After recognizing each elementary PID, the TS decoder 3 extracts transport stream packet (Hereinafter, it is called TS packet) of PID matched with the elementary PID (S8). In this way, the PAT, the CAT, the PMT, and the TS packet of each type are recorded in the information record media 4 such as an optical disk, a magnetic disk, or a semiconductor memory. In this case, all transport stream including necessary data may be recorded in the information record media 4.

Figure 8:
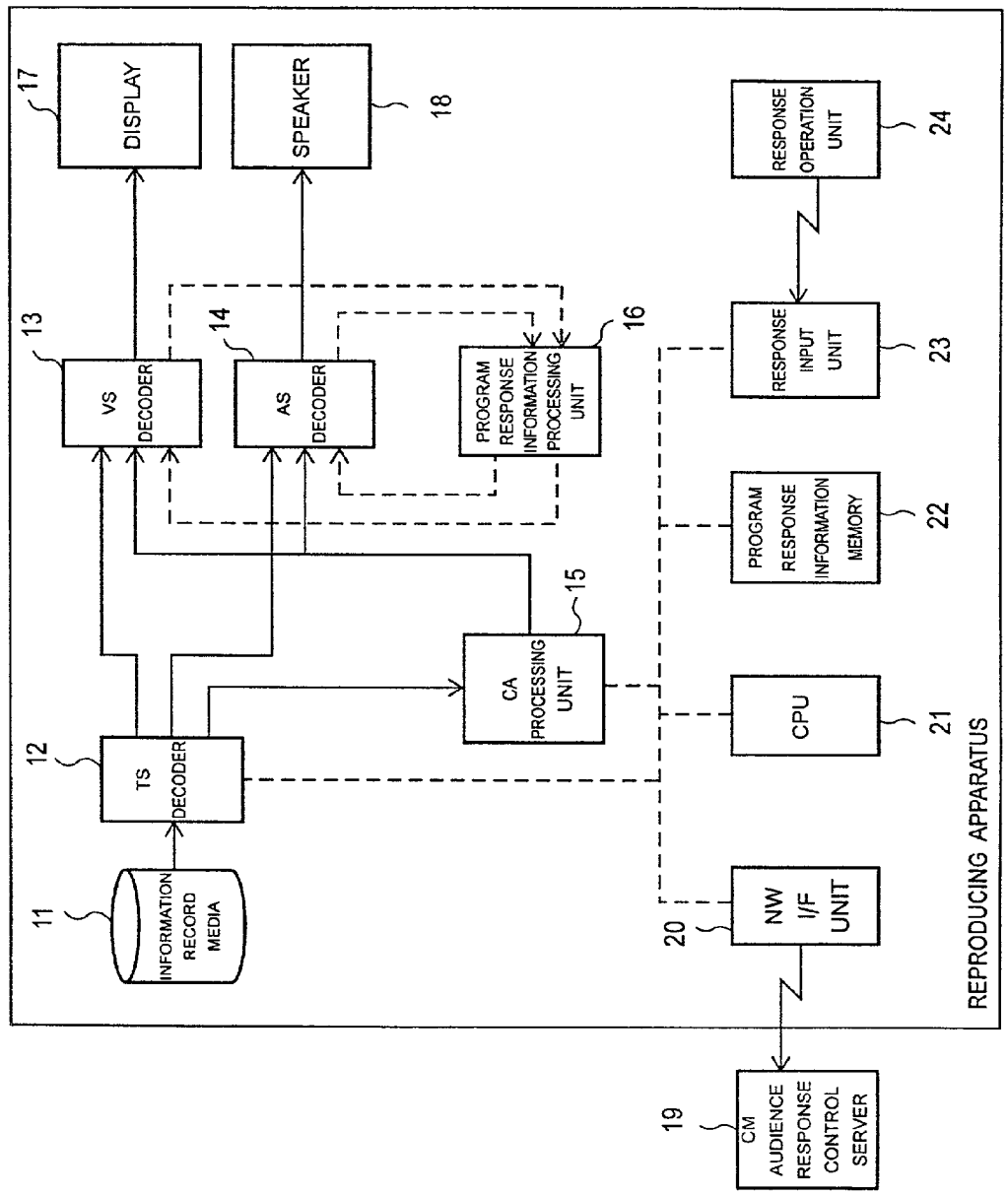
FIG. 8 is a block diagram of a reproducing apparatus according to one embodiment of the present invention.

Next, FIG. 8 is a block diagram of a broadcast program reproducing apparatus for the viewer to watch the program data recorded in the information record media 4. In FIG. 8, the broadcast program reproducing apparatus includes an information record media 11, a MPEG 2 transport stream decoder 12 (Hereinafter, it is called TS decoder), a video stream decoder 13 (Hereinafter, it is called VS decoder), an audio stream decoder 14 (Hereinafter, it is called AS decoder), a conditional access processing unit 15 (Hereinafter, it is called CA processing unit), a program response information processing unit 16, a display 17, a speaker 18, a network interface (I/F) unit 20 (Hereinafter, it is called NW interface unit), a CPU 21, a program response information memory 22, and a response input unit 23. The response input unit 23 inputs data from a response operation unit 24 executable by a remote operation by the viewer. The NW interface unit 20 is an interface to communicate to a CM audience response control server 19 through a predetermined network.

Figure 9:
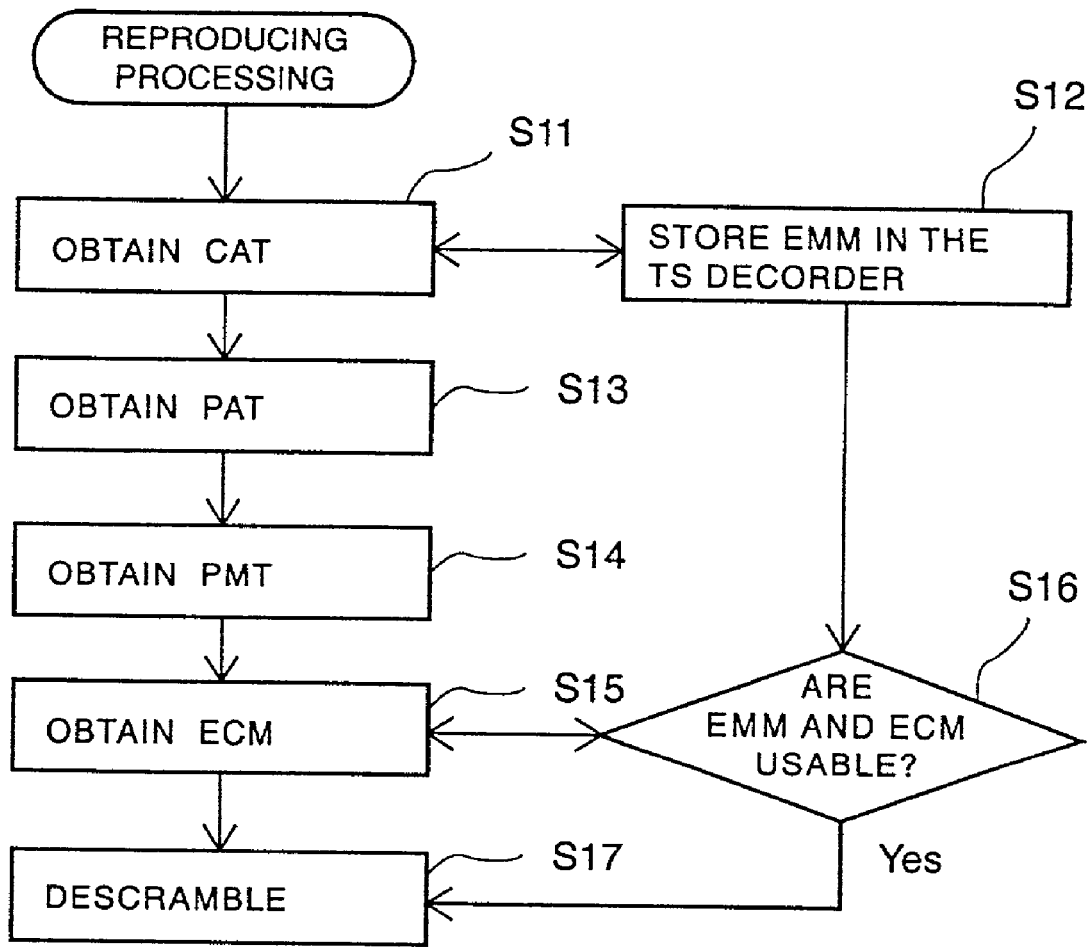
FIG. 9 is a flow chart of reproducing processing of the reproducing apparatus in FIG. 8.
Figure 10:
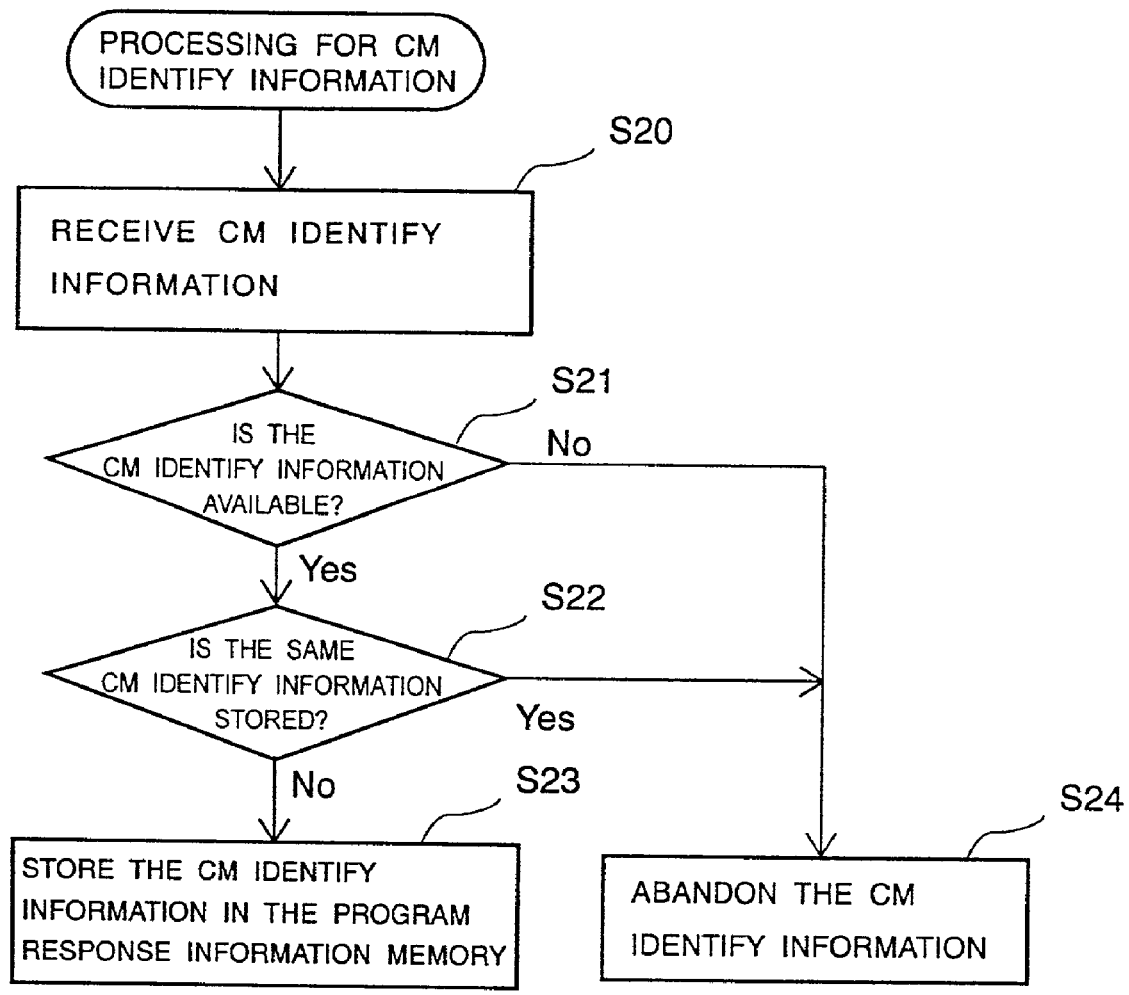
FIG. 10 is a flow chart of processing for the commercial identify information of the reproducing apparatus according to one embodiment of the present invention.

The processing of the broadcast program reproducing apparatus in FIG. 8 is explained by referring to flow charts shown in FIGS. 9 and 10. Assume that the program data is recorded in the information record media 4 of the broadcast program recording apparatus shown in FIG. 5 and the recorded program data is reproduced by the broadcast program reproducing apparatus shown in FIG. 8. FIG. 9 is a flow chart of reproducing processing of the broadcast program reproducing apparatus. First, the reproducing processing is explained by referring to FIG. 9.

The transport stream read from the information record media 11 (corresponding to the information record media 4 in FIG. 5) is supplied to the TS decoder 12. The TS decoder 12 retrieves CAT (Conditional Access Table) from the transport stream and obtains ID of TS packet (CA_PID) including the cryptograhic decode information as shown in FIG. 7 (S11). Furthermore, the. TS decoder 12 obtains EMM by using TS packet of CA_PID. The EMM is temporarily stored in the TS decoder 12 (S12). Next, the TS decoder 12 retrieves PAT (Program Association Table) from the transport stream and obtains program map PID from the PAT as shown in FIG. 7 (S13). Furthermore, the TS decoder 12 searches PMT (Program Map Table) by using the program map PID and obtains ID of TS packet (CA_PID) including the cryptograph decode information from the PMT (S14). The TS decoder 12 obtains ECM by using TS packet of CA_PID (S15)(The ECM packet is not shown in FIG. 7). Next, the TS decoder 12 decides whether the EMM and the ECM are usable in the reproducing apparatus (S16). If they are usable, the EMM and the ECM are supplied to the VS decoder 13 and the AS decoder 14. On the other hand, the TS decoder 12 retrieves TS packet of elementary PID of each stream type (video packet, audio packet) by using the PMT as shown in FIG. 7, and generates video stream and audio stream. The video stream and the audio stream are respectively supplied to the decoder of each stream type (VS decoder 13, AS decoder 14). Each decoder 13 and 14 descrambles the corresponding data stream by using the EMM and the ECM.

If the user data (i) shown in FIG. 2 is included in the video stream, the VS decoder 13 extracts the user data (i) and supplies it to the program response information processing unit 16. When the program response information processing unit 16 receives 64 units of the user data (i), the CM identify information shown in FIG. 1 is compounded. FIG. 10 is a flow chart of processing of the program response information processing unit 16 in case of receiving the CM identify information. The processing for the CM identify information is explained by referring to FIG. 10.

In case of receiving the CM identify information (S20), the program response information processing unit 16 checks the available day in the CM identify information. If the available day has already expired, the CM identify information is abandoned (S24). Next, the program response information processing unit 16 confirms whether the same CM identify information is already stored in the program response information memory 22 (S22). If the same CM identify information is not stored, the program response information processing unit 16 sets a flag "1" representing the viewer's non-response (Hereinafter, it is called non-response flag) to the CM identify information, and stores the CM identify information with the non-response flag in the program response information memory 22 (S23). If the same CM identify information is already stored in the program response information memory 22, the CM identify information is abandoned (S24). Furthermore, at step S23, the program response information processing unit 16 outputs indication of multiplexing message or sound that the response request information is included in CM contents data to the VS decoder 13 and the AS decoder 14 while the CM contents data are reproducing.

Next, a method for the viewer to respond based on the CM identify information is explained. For example, after watching CM, the viewer can display a list of CM identify information corresponding to the non-response flag to the CPU 21 by operating through the response operation unit 24. In response to this indication, the CPU 21 extracts the CM identify information set by the non-response flag (flag value is "1") from the program response information memory 22, and outputs the list through the display 17 in order for the viewer to discriminate each CM. By executing predetermined operation through the response operation unit 24, the viewer selects his desired CM identify information to be responded from the list, and indicates to the CPU 21 that he responds to the selected CM identify information. In response to this indication, the CPU 21 indicates to the program response information processing unit 16 to create CM audience response information for the selected CM identify information. For example, as shown in FIG. 11A, the CM audience response information includes a CM identifier (CM_id) of the selected CM identify information and an apparatus identifier (Apparatus_id) of the reproducing apparatus shown in FIG. 8. In this case, the CM identifier of the selected CM identify information is stored in the program response information memory 22 and the apparatus identifier is stored in the CA processing unit 15.

Next, by using the IP address of the CM audience response control server 19 in the selected CM identify information, the CPU 21 sends the CM audience response information to the CM audience response control server 19 from the NW interface unit 20 through digital line such as ISDN. In this case, telephone number may be used instead of the IP address, and the CM audience response information can be sent to the CM audience response control server 19 through telephone line. Furthermore, if an identifier of the viewer (Hereinafter, it is called a user identifier) is stored in a memory such as ROM of the response operation unit 24, the user identifier is included in a response indication message informed to the CPU 21 by the viewer's operation through the response operation unit 24. Alternatively, if the response operation unit 24 is personalized to a particular viewer, the user identifier stored in the response operation unit 24 is sent to the response input unit 23 by the viewer's operation through the response operation unit 24, and the user identifier is temporarily stored in the response input unit 23.

In these cases, the program response information processing unit 16 may create the CM audience response information by additionally combining the user identifier. As shown in FIG. 11B, the CM audience response information includes the CM identifier, the apparatus identifier, and the user identifier (User_id). In this way, the CM audience response information is sent to the CM audience response control server 19.

Furthermore, the program response information memory 22 may store the CM identify information in correspondence with the user identifier of the viewer who responded to the CM identify information. In this case, for example, by the viewer's operation through the response operation unit 24 storing the user identifier, the user identifier is input from the response operation unit 24 to the program response information processing unit 16 through the response input unit 23. In case of creating the CM audience response information, if the CM identify information with the same user identifier is already stored in the program response information memory 22, the CM audience response information for this CM identify information is not created. Alternatively, in case of displaying a list of CM identify information of non-response, if the CM identify information with the same user identifier is already stored in the program response information memory 22, this CM identify information is not displayed in the list. In short, when the viewer watches the CM already watched by the same viewer, it is desired that the viewer cannot respond to this CM again. Furthermore, contents of the program response information memory 22 is confirmed periodically or in case of turning on the electric source. If the available day in the CM identify information expires, this CM identify information can be deleted in the program response information memory 22.

The CM audience response control server 19 counts the response result by unit of the reproducing apparatus or by unit of the viewer according to the CM identifier, the apparatus identifier, and the user identifier in the CM audience response information. For example, point information is created by giving high point to the reproducing apparatus or the viewer corresponding to large number of response. Hereafter, by referring to this point information, a broadcast receiving contractor as a owner of the broadcast recording/reproducing apparatus or the viewer (He is not always the broadcast receiving contractor) who watched the CM can receive a service such as cash back in proportion to the number of points.

Furthermore, the program response information memory 22 may store the CM identify information in correspondence with the apparatus identifier and the user identifier by which the CM is already watched. In case of creating the CM audience response information or in case of displaying a list of CM identify information of non-response, by referring to the contents stored in the program response information memory 22, an injustice action such as multi-point acquirement for the viewer by repeatedly watching the same CM is avoided.

In the above-mentioned embodiment, the broadcast program data are temporarily stored in the information record media 4 and 11, and reproduced after that in order for the viewer to watch. However, in case that the program data is reproducing while recording in the information record media., i.e., in case of time shift view, the above-mentioned embodiment can be applied.

Furthermore, in the above-mentioned embodiment, the program data is broadcasted by satellite communication or ground wave. However, in case that the program data is broadcast by cable, the above-mentioned embodiment can be applied. In this case, the CM audience response information may be sent to the CM audience response control server 19 through the cable. The CM audience response control server 19 may be the same as the broadcasting station, or may be the server of exclusive use for receiving the CM audience response information.

Furthermore, in case that output from the TS decoder 3 is supplied to the VS decoder 13 and the AS decoder 14 without the information record media 4 and 11, the present embodiment can be applied in order for the viewer to respond to the CM. By using the communication line, the program data recorded in the information record media 4 and 11 may be transferred to another recording/reproducing apparatus and may be reproduced by this apparatus in order to respond to the CM.

As mentioned-above, in the present embodiment, in case of recording the broadcast CM and reproducing after that, by giving the point to the viewer or the owner of the recording/reproducing apparatus, they can enjoy various kinds of services. As a result, it is promoted for the viewer to record/reproduce the program without skipping the CM. Furthermore, even if the broadcast program recorded in the recording apparatus is reproduced by another reproducing apparatus, the point is given to the owner of another reproducing apparatus, and the combination of the CM identifier of the CM and the apparatus identifier of the reproducing apparatus is stored as an evidence whether the CM is reproduced by this reproducing apparatus. Accordingly, the user cannot get a large point award by repeatedly watching of the same CM. If the viewer feels anxiety about disclosure of privacy by responding to the CM, he may not respond to the CM. In this case, the disclosure of his privacy is prevented instead of getting the point. Furthermore, for example, a program to respond to a questionnaire may be recorded in media such as DVD-ROM by a format of the response request information. In this case, the questionnaire is set out by the viewer's response while reproducing the program, and the point is given to the viewer who responded to the questionnaire.

Furthermore, in the above-mentioned embodiment, the broadcast program recording apparatus and the broadcast program reproducing apparatus are explained as each different apparatus. However, the components shown in FIGS. 5 and 8 may be combined as one apparatus such as the broadcast program recording/reproducing apparatus. In this case, the above-mentioned embodiment can be applied.

In the present invention, in case of recording the broadcast program including CM to which the response request information (CM identify information) is added and in case of reproducing the broadcast program after that, the recording/reproducing without skipping the CM is promoted to the viewer.

A memory device, such as a CD-ROM, floppy disk, hard disk, magnetic tape, or semiconductor memory can be used to store instructions for causing a processor or computer to perform the processes described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for recording and reproducing a broadcast program, comprising:
    a receiver configured to receive program content data broadcasted, the program content data including commercial content data, the commercial content data including commercial identify information, the commercial identify information including a commercial identifier and a server address of a commercial audience response control server;
    a memory configured to record the program content data received by said receiver;
    a decoder configured to decode the program content data in case of reproducing the program content data stored in said memory, and to extract the commercial identify information from the decoded program content data;
    a presentation unit configured to inform a viewer of the commercial identify information in case of reproducing the commercial content data; and
    a sending unit configured to create commercial audience response information in response to the viewer's selection for the commercial identify information, the commercial audience response information including the commercial identifier and an identifier of said apparatus, and to send the commercial audience response information to the commercial audience response control server.

2. The apparatus according to claim 1, wherein the commercial identify information is multiplexed on the commercial content data.

3. The apparatus according to claim 2, wherein the commercial identify information includes an available day as an effective term, a company name as a commercial sponsor, and a commercial name as a title.

4. The apparatus according to claim 3,
    wherein the program content data are previously encoded as a bit stream of each picture by predetermined coding order in case of broadcastly distributing, and
    wherein the commercial identify information is divided into a plurality of elements as response user data, and each element is sequentially inserted on arbitrary pictures of encoded commercial contents data.

5. The apparatus according to claim 4,
    wherein said decoder sequentially extracts each element from the arbitrary picture of decoded commercial content data, and regenerates the commercial identify information by combining the plurality of elements.

6. The apparatus according to claim 5, further comprising a program response information memory configured to store the commercial identify information with a non-response flag if the available day in the commercial identify information is effective and the same commercial identify information is not already stored.

7. The apparatus according to claim 6,
    wherein said presentation unit presents a message or a sound that the commercial identify information is included in the commercial contents data while the commercial contents data is reproducing.

8. The apparatus according to claim 7,
    wherein said presentation unit displays a list of the commercial identify information corresponding to the non-response flag, and
    further comprising a response operation unit configured for the viewer to select the commercial identify information to be responded to from the list.

9. The apparatus according to claim 8,
    wherein the commercial audience response information includes the commercial identifier of the commercial identify information selected by said response operation unit and, the identifier of said apparatus and a user identifier of the viewer through said response operation unit.

10. The apparatus according to claim 9,
    when said sending unit sends the commercial audience response information to the commercial audience response control server said program response information memory stores the commercial identify information and the user identifier.

11. The apparatus according to claim 10,
    when said response operation unit selects commercial identify information from the list, if said program response information memory already stores the commercial identify information and a user identifier of a viewer through said response operation unit, said sending unit does not create the commercial audience response information.

12. A method for recording and reproducing a broadcast program in an apparatus, composing:
    receiving program content data broadcasted, the program content data including commercial content data, the commercial content data including commercial identify information, the commercial identify information including a commercial identifier and a server address of a commercial audience response control server;
    recording the program content data received at the receiving step in a memory;
    decoding the program content data in case of reproducing the program content data recorded in said memory;
    extracting the commercial identify information from the decoded program content data;
    informing a viewer of the commercial identify information in case of reproducing the commercial content data;
    creating commercial audience response information in response to the viewer's selection for the commercial identify information, the commercial audience response information including the commercial identifier and an identifier of said apparatus; and sending the commercial audience response information to the commercial audience response control server.

13. The method according to claim 12,
wherein the commercial identify information is multiplexed on the commercial content data.

14. The method according to claim 13, wherein the commercial identify information includes a an available day as an effective term, a company name as a commercial sponsor, and a commercial name as a title.

15. The method according to claim 14,
wherein the program content data are previously encoded as a bit stream of each picture by predetermined coding order in case of broadcastly distributing, and wherein the commercial identify information is divided into a plurality of elements as response user data, and each element is sequentially inserted on arbitrary pictures of encoded commercial contents data.

16. The method according to claim 15,
at the decoding step, further comprising: sequentially extracting each element from the arbitrary picture of decoded commercial contents data; and regenerating the commercial identify information by combining the plurality of elements.

17. The method according to claim 16, further comprising:

storing the commercial identify information with a non-response flag if the available day in the commercial identify information is effective and the same commercial identify information is not already stored.

18. The method according to claim 17, further comprising:

presenting a message or a sound that the commercial identify information is included in the commercial content data while the commercial contents data is reproducing.

19. The method according to claim 18, further comprising:

displaying a list of the commercial identify information corresponding to the non-response flag, and selecting the commercial identify information to be responded to from the list in response to the viewer's operation.

20. The method according to claim 19, at the sending step, further comprising:

creating commercial audience response information including the commercial identifier of the selected commercial identify information the identifier of said apparatus, and a user identifier of the viewer.

21. The method according to claim 20, at the sending step, further comprising:

when the commercial audience response information is sent to the commercial audience response control server, storing the commercial identify information and the user identifier in a program response information memory.

22. The method according to claim 21,
when commercial identify information is selected by a reviewer from the list, if said program response information memory already stores the commercial identify information and a user identifier of the viewer, the commercial audience response information is not created.

23. A computer program product for use with a computer, comprising:

a computer usable medium having computer readable program code embodied in said medium for causing said computer to record and reproduce a broadcast program, said computer readable program code having:

computer readable program code to receive program content data broadcasted, the program content data including commercial content data, the commercial content data including commercial identify information, the commercial identify information including a commercial identifier and a server address of a commercial audience response control server;

computer readable program code to record the program content data in a memory;

computer readable program code to decode the program content data in case of reproducing the program content data recorded in said memory;

computer readable program code to extract the commercial identify information from decoded program content data;

computer readable program code to inform a viewer of the commercial identify information in case of reproducing a commercial content data;

computer readable program code to create commercial audience response information in response to the viewer selection for the commercial identify information, the commercial audience response information including the commercial identifier and an identifier of said computer; and computer readable program code to send the commercial audience response information to the commercial audience control server.

* * * * *